United States Patent
Hild et al.

(10) Patent No.: US 11,790,175 B2
(45) Date of Patent: *Oct. 17, 2023

(54) SYSTEM AND METHOD FOR PHONETIC HASHING AND NAMED ENTITY LINKING FROM OUTPUT OF SPEECH RECOGNITION

(71) Applicant: Fresh Consulting, Inc, Bellevue, WA (US)

(72) Inventors: Robert Hild, Sammamish, WA (US); Sean Alan McKay, Prescott, AZ (US); Eli Rodriguez, Redmond, WA (US)

(73) Assignee: Fresh Consulting, Inc, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,517

(22) Filed: Nov. 8, 2021

(65) Prior Publication Data

US 2022/0067291 A1 Mar. 3, 2022

Related U.S. Application Data

(63) Continuation of application No. 16/424,333, filed on May 28, 2019, now Pat. No. 11,170,170.

(51) Int. Cl.
*G10L 15/00* (2013.01)
*G10L 15/26* (2006.01)
*G06F 40/295* (2020.01)
*G10L 21/0364* (2013.01)

(52) U.S. Cl.
CPC ............ *G06F 40/295* (2020.01); *G10L 15/26* (2013.01); *G10L 21/0364* (2013.01)

(58) Field of Classification Search
CPC .... G06F 40/295; G06F 16/313; G06F 16/345; G06F 40/289; G06F 40/279; G06F 40/205; G06F 40/211; G06F 40/221; G06F 40/10; G10L 15/26; G10L 21/0364; G10L 15/22; G10L 15/08; G10L 2015/025;
(Continued)

(56) References Cited

U.S. PATENT DOCUMENTS 9,190,056 B2 11/2015 Zhu et al.
9,361,887 B1 6/2016 Braga et al.
9,484,021 B1 11/2016 Mairesse et al.
(Continued)

OTHER PUBLICATIONS

Knill, Katherine, et al. "Language independent and unsupervised acoustic models for speech recognition and keyword spotting." (2014). (Year: 2014).*
(Continued)

*Primary Examiner* — Michael Ortiz-Sanchez
(74) *Attorney, Agent, or Firm* — SEED INTELLECTUAL PROPERTY LAW GROUP LLP

(57) ABSTRACT

A system and method for named entity linking from the output of speech-to-text systems by using an approximate string matching that normalizes common sounds, removes ambiguities, removes silent consonants, and accounts for speech slurring for long names. Additionally, the system and method for named entity linking from the output of speech-to-text systems employs a hierarchical matching system that performs multiple attempts using various mechanisms for resolving the name, starting with a very strict mechanism, and proceeding sequentially through less strict mechanisms.

24 Claims, 16 Drawing Sheets

(58) Field of Classification Search
CPC ......... G10L 15/02; G10L 15/00; G10L 21/00;
G10L 25/00; G10L 15/04
See application file for complete search history.

(56) References Cited

U.S. PATENT DOCUMENTS

| | | |
|---|---|---|
| 2003/0191625 A1 | 10/2003 | Gorin et al. |
| 2010/0082333 A1 | 4/2010 | Al-Shammari |
| 2011/0173000 A1 | 7/2011 | Yamamoto et al. |
| 2012/0101823 A1 | 4/2012 | Weng et al. |
| 2012/0323565 A1 | 12/2012 | Hildreth et al. |
| 2013/0035939 A1 | 2/2013 | Gilbert et al. |
| 2017/0040016 A1* | 2/2017 | Cui .......................... G10L 15/02 |
| 2017/0193396 A1 | 7/2017 | Kanani et al. |
| 2017/0197152 A1 | 7/2017 | Bojja et al. |
| 2022/0067291 A1* | 3/2022 | Hild ................... G10L 21/0364 |

OTHER PUBLICATIONS

Finkel et al., "Joint Parsing and Named Entity Recognition," *Human Language Technologies: The 2009 Annual Conference of the North American Chapter of the ACL*, Boulder, Colorado, Jun. 2009, pp. 326-334.

Ríos et al., "Sentiment Categorization on a Creole Language with Lexicon-Based and Machine Learning Techniques," 2014 Brazilian Conference on Intelligent Systems, IEEE, 2014, pp. 37-43.

Satapathy et al., (eds.), "Information Systems Design and Intelligent Applications: Proceedings of Fifth International Conference India 2018, vol. 2," in *Advances in Intelligent Systems and Computing*, vol. 863, 2018, 460 pages.

* cited by examiner

SYSTEM AND METHOD FOR PHONETIC HASHING AND NAMED ENTITY LINKING FROM OUTPUT OF SPEECH RECOGNITION

BACKGROUND

Technical Field

The present disclosure generally relates to systems and methods for phonetic hashing in association with speech recognition, and particularly, to systems and methods for named entity linking from the output of speech recognition.

Description of the Related Art

Speech recognition systems have progressed to the point where they enable people to make general queries in a successful manner. These speech recognition systems combine with natural language understanding modules to better identify the sounds and words that were intended by the speaker. A common need by these systems is to identify which parts of speech are named entities in the spoken query. This is referred herein as named entity linking. Named entity linking identifies the text or sound that corresponds to some named entity (e.g., is this a proper name is the text or audio that is being examined), but which entity is not necessarily known. In contrast, speech recognition systems focus on determining "who" the person is that has been determined to be the named entity.

Speech recognition systems, such as the Echo by Amazon, analyze speech and determine an approximate best-representation of the speech as text. Pronunciation will vary amongst speakers, regions, or even for different parts of a sentence, where the start of a sentence is often more pronounced than the end of the sentence. Speech recognition systems will also make their approximations without consideration of a specific entity knowledge-base, so may incorrectly transcribe proper names as common words, like "Franz" being reported as "friends." Additional sources of error may occur when there is variation in the spelling of proper names, such as "Sean," "Shawn," and "Shaun" or "Kristi," "Cristi," or "Kristy," which are often pronounced the same.

Other prior art named entity linking algorithms include Soundex, Match Rating Codex, Nysiis, Metaphone, and Porter Stem. Named entity linking algorithms may be tested to determine how they perform under certain circumstances. Such tests include: (1) the Baseline test, (2) the First Name Match test, (3) the Last Name Match test, (4) the Nickname Match test, and (5) the Vowel Case Mangling test. The baseline test is used by the particular algorithm to find a match result, after which the match result is compared against a candidate name. The First Name Match test uses only the first name portion of a candidate's name to find results. This test is generally expected to do poorly due to the large number of expected collisions in first names. The Last Name Match test uses only the last name portion of a candidate's names to find results. This test is generally expected to do better than the First Name Match test because collisions would occur but be less frequent. The Nickname Match test, which is used for a subset of names, stores a corresponding nickname in conjunction with the last name. For example "Harold Finch" might have a nickname of "Harry Finch." Accordingly, "Harry Finch" may be used as an input. In the Vowel Case Mangling test, the vowels of the candidate name are transposed to other vowels, and the case of each letter was modified. This tested whether the algorithm was case sensitive, and how it handled vowels with respect to similarities.

Furthermore, many prior art named entity linking systems have significant problems with false positives. A "false positive" is defined herein as when a match is reported, but the match is for the wrong person. The importance of a "false positive" can be thought of with respect to medical diagnosis. If a test diagnoses a person with a critical illness, numerous other tests and work are done upon the person. Additionally, the physiological trauma may be significant if a person is incorrectly told that they have a terminal illness when they in fact do not have the terminal illness. If the diagnosis was a "false positive" all that extra work was done in vain. In contrast, a "false negative" could mean that other tests would be run that would reveal the problem or eliminate possible causes.

In a scenario of a "false positive" in the technology realm, it is possible that a false positive could result in the data being changed of a different person than intended. In contrast, a "false negative" in the technology realm would not risk the wrong data being updated because no results would be returned. Notably, a "false negative" in the technology realm may have other issues, such as the temporary denial of service. Nevertheless, a "false negative" in the technology realm would not result in data destruction issues.

There is a continuing need in the art for named entity linking from the output of speech recognition that provides a high quality of matches and is resistant to false positives.

BRIEF SUMMARY

In accordance with some implementations, a system and method is disclosed for phonetic hashing and named entity linking from the output of speech-to-text systems by using approximate string matching that normalizes common sounds, removes ambiguities, removes silent consonants, and accounts for speech slurring for long names. Additionally, the system and method for phonetic hashing and named entity linking from the output of speech-to-text systems may employ a hierarchical matching system that performs multiple attempts to resolve non-exact matches of a name, starting with a very strict mechanism, and proceeding sequentially through less strict mechanisms.

In some implementations, the method for phonetic hashing and named entity linking from the output of speech-to-text systems includes: performing phonetic hashing and disambiguation that normalize common sounds and cause similar sounds to generate a same output; removing silent consonants; normalizing consonants sounds; removing ending letters from longer names, thereby accounting for speech slurring that occurs with longer names; removing vowels; and performing multiple attempts to resolve non-exact matches using a hierarchical matching system, starting with a strict mechanism, and proceeding sequentially through less strict mechanisms, wherein the hierarchical matching system provides a high resistance to false positives.

In other implementations, the phonetic hashing and named entity linking method includes initialization of data that breaks multiple word names into separate parts. In other aspects of some implementations, the phonetic hashing and named entity linking method includes normalization of text that removes spaces and makes all text lowercase. In still other aspects of some implementations, the phonetic hashing and named entity linking method includes checking for partial matches by including a creolizing and comparing disambiguation process. In yet other aspects of some implementations, the phonetic hashing and named entity linking method includes partial match retrieval process. In additional aspects of some implementations, the removing ending letters from longer names includes shortening an entity's creolized text by two characters if a creolized candidate text is longer than five characters.

In some implementations, the phonetic hashing and named entity linking method includes a high level creolizing text process that provides a space prefix before a text entry for constant distinguishing of a start of a word in a modified text. In other aspects of some implementations, the phonetic hashing and named entity linking method includes normalizing 'x' sounds. In still other aspects of some implementations, the phonetic hashing and named entity linking method includes normalizing 'g' sounds. In yet other aspects of some implementations, the phonetic hashing and named entity linking method includes a cleanup process that includes removing placeholder symbols, removing all punctuation, and removing all vowels. In additional aspects of some implementations, the partial match retrieval process prioritizes unambiguous matches most highly, and treats matches according to a specific hierarchy with priority based on how much of the input text is consumed. In other aspects of some implementations, the priority of the specific hierarchy is priority creole partial match, first name partial match, creole first name partial match, and last name partial match.

In some implementations, a system for phonetic hashing and named entity linking from the output of speech-to-text systems by reducing names to common sound codes includes: one or more processors; and a memory device storing a set of instructions that when executed by the one or more processors, causes the one or more processors to: perform phonetic hashing and disambiguation that normalize common sounds and cause similar sounds to generate a same output; remove silent consonants; normalize consonants sounds; remove ending letters from longer names, thereby accounting for speech slurring that occurs with longer names; remove vowels; and perform multiple attempts to resolve non-exact matches using a hierarchical matching system, starting with a strict mechanism, and proceeding sequentially through less strict mechanisms, wherein the hierarchical matching system provides a high resistance to false positives.

In some implementations, the phonetic hashing and named entity linking system includes a check for partial matches by including a creolizing and comparing disambiguation process. In other aspects of some implementations, the phonetic hashing and named entity linking system includes a partial match retrieval process. In still other aspects of some implementations, the removing ending letters from longer names includes shortening an entity's creolized text by two characters if a creolized candidate text is longer than five characters. In yet other aspects of some implementations, the phonetic hashing and named entity linking system normalizes 'x' sounds. In additional aspects of some implementations, the phonetic hashing and named entity linking system normalizes 'g' sounds. In other aspects of some implementations, the phonetic hashing and named entity linking system employs a cleanup process that includes removing placeholder symbols, removing all punctuation, and removing all vowels.

In other aspects of some implementations, the phonetic hashing and named entity linking system includes a partial match retrieval process that prioritizes unambiguous matches most highly, and treats matches according to a specific hierarchy with priority based on how much of the input text is consumed. In further aspects of some implementations, the priority of the specific hierarchy is the following order: priority creole partial match, first name partial match, creole first name partial match, and then last name partial match.

In some implementations, a system for phonetic hashing and identifying words or commands from audio information includes: one or more processors; and a memory device storing a set of instructions that when executed by the one or more processors, causes the one or more processors to: perform phonetic hashing and disambiguation that normalize common sounds and cause similar sounds to generate a same output; remove silent consonants; normalize consonants sounds; remove ending letters from longer words, thereby accounting for speech slurring that occurs with longer words; and remove vowels.

In some implementations, the memory device stores a set of instructions that when executed by the one or more processors, further causes the one or more processors to: perform multiple attempts to resolve non-exact matches using a hierarchical matching system, starting with a strict mechanism, and proceeding sequentially through less strict mechanisms, wherein the hierarchical matching system provides a high resistance to false positives.

In some implementations, a system for phonetic hashing and identifying words or commands from audio information includes: one or more processors; and a memory device storing a set of instructions that when executed by the one or more processors, causes four or more of the following: (1) perform phonetic hashing and disambiguation that normalize common sounds and cause similar sounds to generate a same output; (2) remove silent consonants; (3) normalize consonants sounds; (4) remove ending letters from longer words, thereby accounting for speech slurring that occurs with longer words; and (5) remove vowels.

In some implementations, the memory device stores a set of instructions that when executed by the one or more processors, further causes the one or more processors to: perform multiple attempts to resolve non-exact matches using a hierarchical matching system, starting with a strict mechanism, and proceeding sequentially through less strict mechanisms, wherein the hierarchical matching system provides a high resistance to false positives.

In some implementations, a system for phonetic hashing and identifying words or commands from audio information includes: one or more processors; and a memory device storing a set of instructions that when executed by the one or more processors, causes three or more of the following: (1) perform phonetic hashing and disambiguation that normalize common sounds and cause similar sounds to generate a same output; (2) remove silent consonants; (3) normalize consonants sounds; (4) remove ending letters from longer words, thereby accounting for speech slurring that occurs with longer words; and (5) remove vowels.

In some implementations, the memory device stores a set of instructions that when executed by the one or more processors, further causes the one or more processors to: perform multiple attempts to resolve non-exact matches using a hierarchical matching system, starting with a strict mechanism, and proceeding sequentially through less strict mechanisms, wherein the hierarchical matching system provides a high resistance to false positives.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1A:
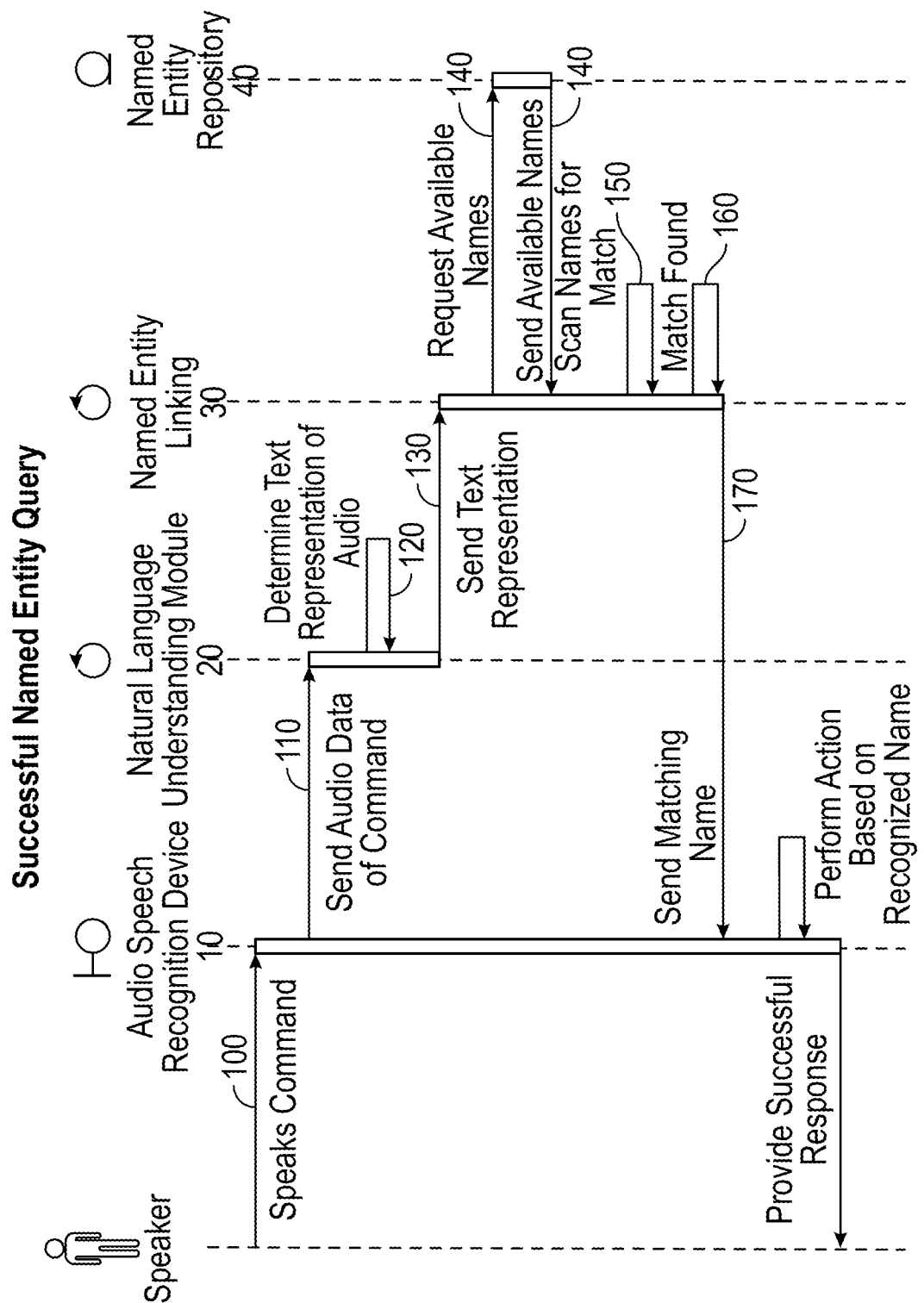
FIG. 1A is a signal flow diagram illustrating a successful named entity query according to the embodiments of the present disclosure.

Persons of ordinary skill in the art will understand that the present disclosure is illustrative only and not in any way limiting. Each of the features and teachings disclosed herein can be utilized separately or in conjunction with other features and teachings to provide a phonetic hashing and named entity linking system and method 30. Representative examples utilizing many of these additional features and teachings, both separately and in combination, are described in further detail with reference to the attached figures. This detailed description is merely intended to teach a person of skill in the art further details for practicing aspects of the present teachings, and is not intended to limit the scope of the claims. Therefore, combinations of features disclosed in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities, and are merely convenient labels applied to these quantities. Unless specifically stated otherwise as apparent from the below discussion, it is appreciated that throughout the description, discussions utilizing terms such as "processing," "computing," "calculating," "determining," "displaying," "configuring," or the like, refer to the actions and processes of a computer system, or similar electronic computing device, that manipulate and transform data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Unless the context requires otherwise, throughout the specification and claims which follow, the word "comprise" and variations thereof, such as "comprises" and "comprising," are to be construed in an open, inclusive sense, that is, as "including, but not limited to" Reference throughout this specification to "one implementation" or "an implementation" means that a particular feature, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise. The headings and Abstract of the Disclosure provided herein are for convenience only and do not interpret the scope or meaning of the implementations.

The mechanism of associating a link between the named entity text and a specific intended entity is referred herein as named entity linking. Named entity linking may involve manipulating the user's speech into a format that is similar to how the named entities are stored which may then be used to identify the named entity and provide an accurate identification of the named entity to subsequent components of the speech recognition system.

Disclosed herein is a phonetic hashing and named entity linking system and method 30 that automatically determines which records refer to the same entity when given an input from a speech recognition device 10. A record is an entry in some knowledge base, or collection of entity information, whether as a file, an article, a spreadsheet, database or other implementation. An entity is an identifiable thing that exists, such as a person, an abstraction, an organization, a location, equipment, product, and the like.

Implementations of the computer implemented phonetic hashing and named entity linking system and method 30 disclosed herein has numerous applications, including use in membership identification systems, where members can be patients, consumers, clients, employees, or other groups of entities. Uniquely, the phonetic hashing and named entity linking system and method 30 (1) provides high disambiguation performance, (2) is highly resistant to providing incorrect matches; and (3) provides high computational throughput.

Some implementations of the phonetic hashing and named entity linking system and method 30 use an approximate string matching technique for scenarios when exact string matches do not exist. The approximate string matching technique addresses many of the common sources of ambiguity in named entities, allowing for high level of accuracy.

In addition to using approximate string matching, the phonetic hashing and named entity linking system and method 30 evaluates hierarchies of matches for named entities, prioritizing low ambiguity, followed by more complete name representation. In the phonetic hashing and named entity linking system and method 30, the combination of the hierarchical match system with the approximate string matching technique results in high performance with low false positives.

When the phonetic hashing and named entity linking system and method 30 receives the linked entry, whether from database, file, set, or other collection of entries, it is then able to proceed with acting upon the initial audio query. Additional components of phonetic hashing and named entity linking system and method 30, such as named entity disambiguation, may further refine the results based on the particular domains of that component. The verbs determined by the voice recognition system may determine which actions, whether retrieval, communication, update or other action, are applied to the identified linked entry. Such actions may include adjusting home audio setting, adjusting video settings, adjusting security setting, adjusting smart home settings, making an on-line purchase, executing an on-line transaction, sending an email or other message, updating a calendar, and the like.

Figure 1B:
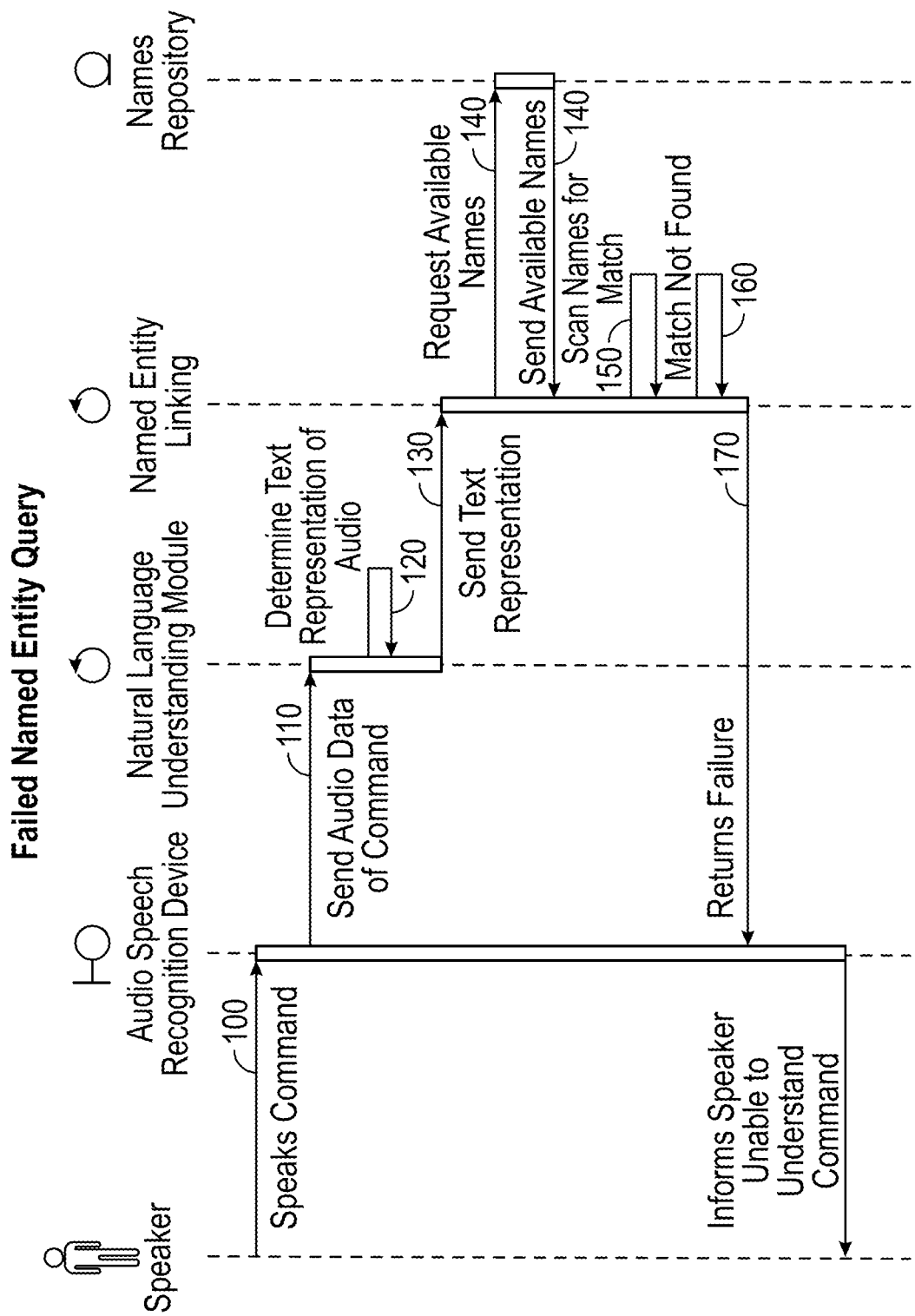
FIG. 1B is a signal flow diagram illustrating an unsuccessful named entity query according to the embodiments of the present disclosure.

FIG. 1A illustrates speech-controlled flow using an implementation of the phonetic hashing and named entity linking system where a user of the system speaks a command at 100 that is relayed to an audio speech recognition device 10. An audio data command is sent at 110 to a natural language understanding module 20 which determines the text representation of the audio at 120. Next, the natural language understanding module 20 sends the entity text information at 130 to the named entity linker 30. The named entity linker 30 queries the named entity repository 40 for available names at 140. The named entity repository 40 may be a database, a file, a collection, or some other mechanism for listing entities, and returns the available entity names. The named entity linker 30 scans the name for a match at 150, and if a match is found at 160, returns that match at 170 to the audio speech recognition device 10. If a match is not found, as shown in FIG. 1B, then a flag indicating failure is returned to the audio speech recognition device 10.

Figure 2A:
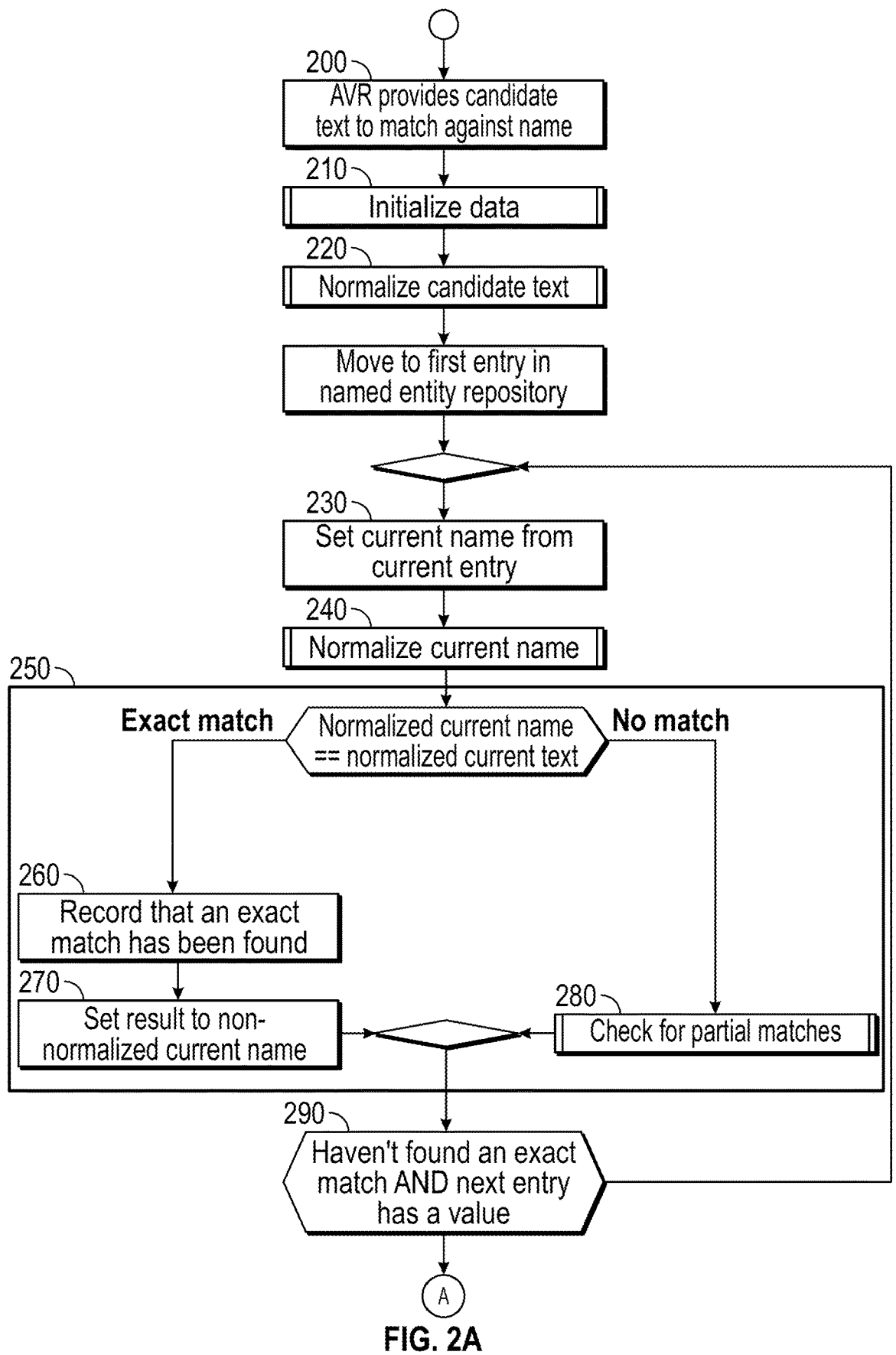
FIG. 2A is a logic flow diagram conceptually illustrating a named entity linking method according to the embodiments of this present disclosure.
Figure 2A:
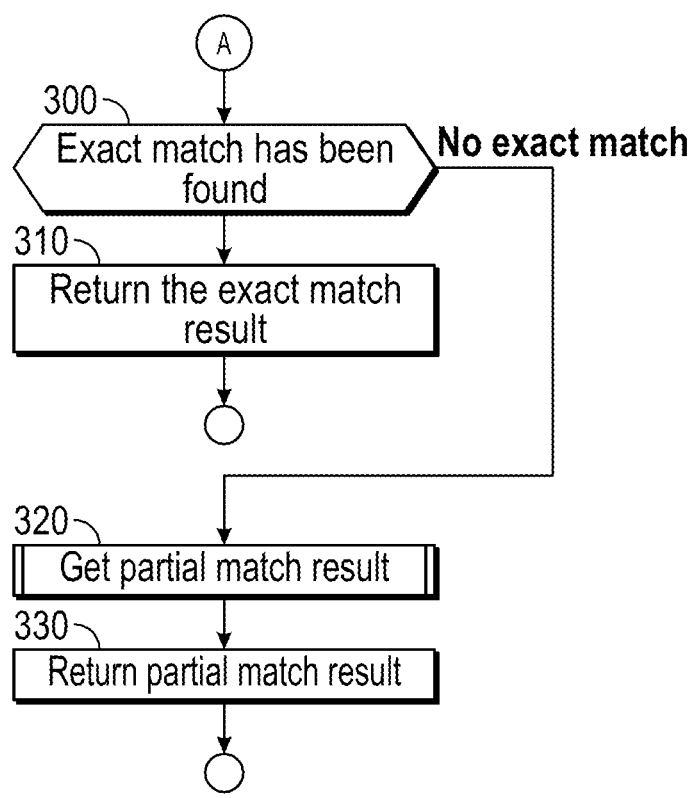

Various implementations of computer implemented methods are shown in detail in FIGS. 2A-3B. FIG. 2A provides an overview of the entire computer implemented method for the phonetic hashing and named entity linking system and method 30. FIGS. 2B-3B provide increasingly granular implementation details, beginning at 150, as described in FIG. 1A.

Figure 2B:
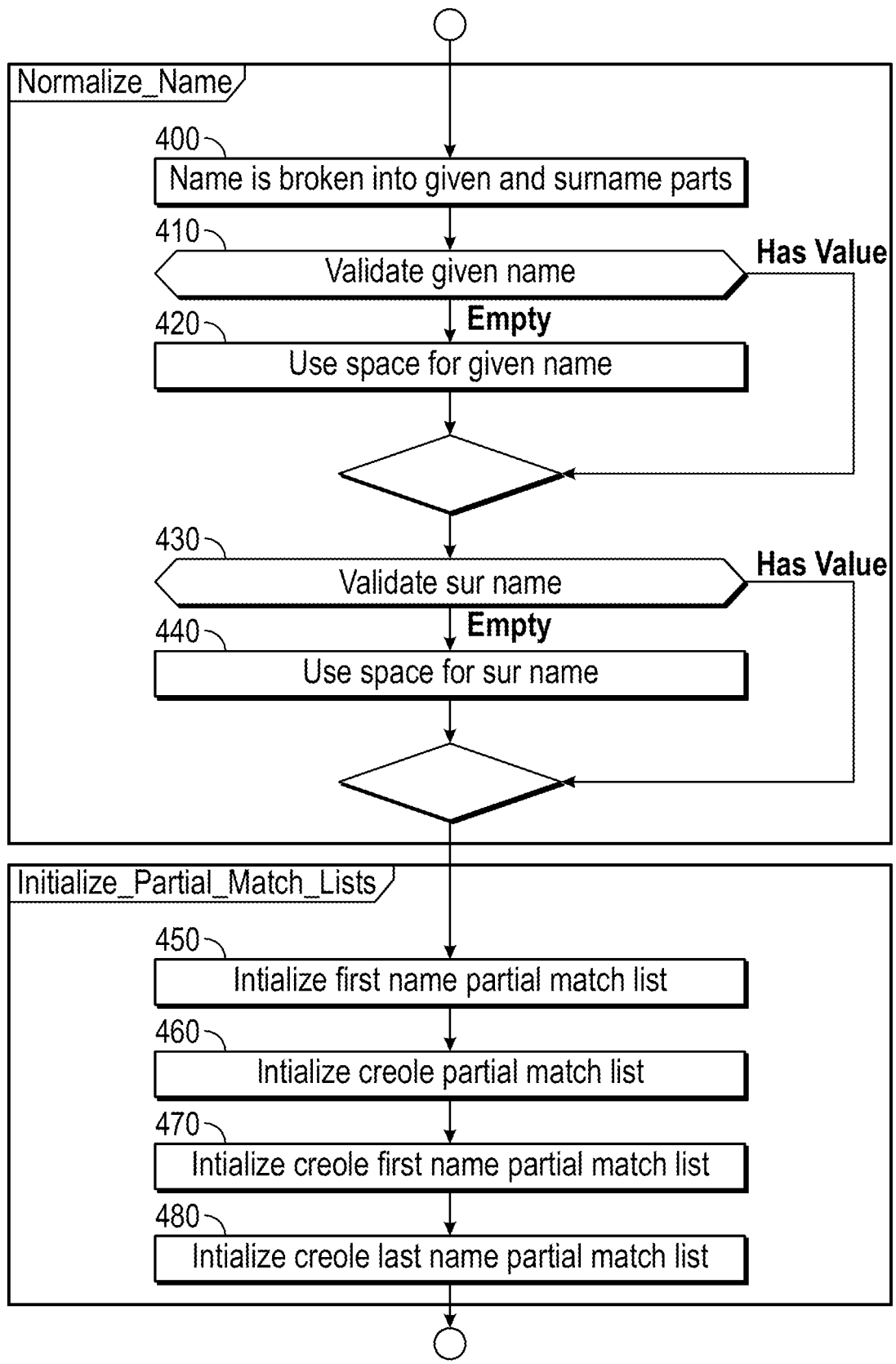
FIG. 2B is a logic flow diagram conceptually illustrating the initialization of data process within the named entity linking method according to the embodiments of this present disclosure.
Figure 2C:
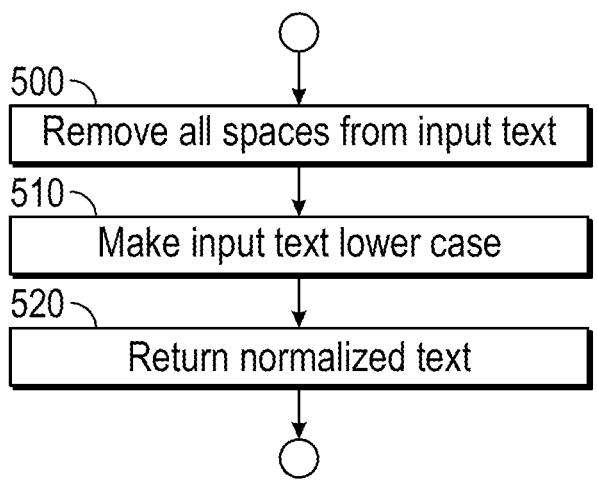
FIG. 2C is a logic flow diagram conceptually illustrating the normalization of text process within the named entity linking method according to the embodiments of this present disclosure.

FIG. 2A begins with the phonetic hashing and named entity linking system and method 30 receiving the candidate text to find an entity at 200. As shown at 210, the phonetic hashing and named entity linking system and method 30 initializes data (FIG. 2B). As shown at 220, the phonetic hashing and named entity linking system and method 30 normalizes the candidate text (FIG. 2C). The phonetic hashing and named entity linking system and method 30 then applies the following process to each entity from the named entity repository 40. The process short-circuits out of the loop if disambiguation results are not needed. As shown at 230, the current entity's name is extracted. As shown at 240, the current entity's name is normalized in the same manner as step 220 (FIG. 2C).

Figure 2D:
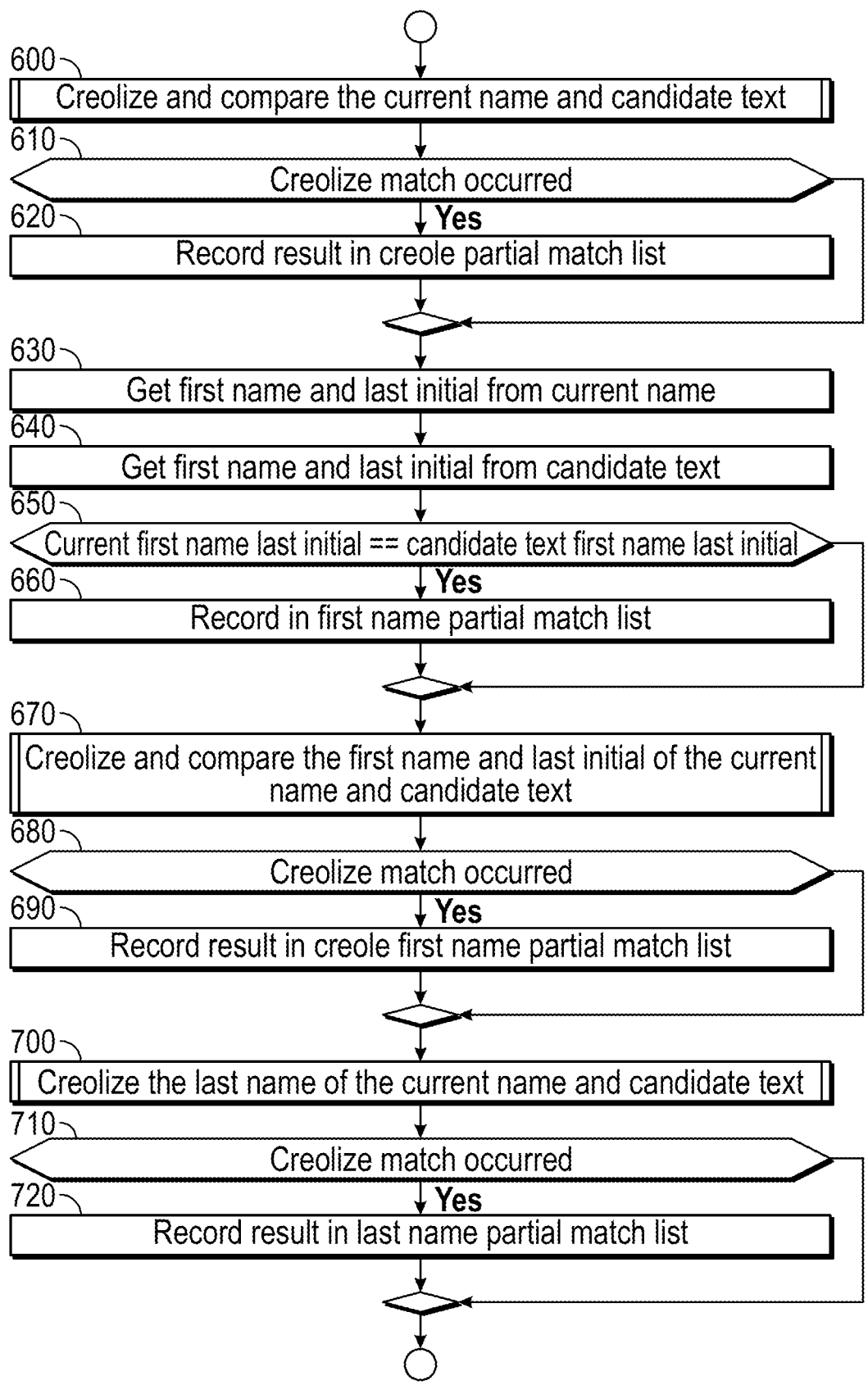
FIG. 2D is a logic flow diagram conceptually illustrating the checking for partial matches process within the named entity linking method according to the embodiments of this present disclosure.

As shown at 250, if the normalized candidate text matches the normalized current entity name, the phonetic hashing and named entity linking system and method 30 records that an exact match has been made, as shown at 260. Then, as shown at 270, the result is set to the current entity. As shown at 280, if the text does not match the current entity name, partial matches are checked (FIG. 2D). As shown at 290, if disambiguation results are desired then all entities will be examined, or if no exact matches have been found then the method proceeds to the next entry. Otherwise, as shown at 300, if an exact match has been found and there is no ambiguity, then as shown at 310, the entity associated with that match is returned. Otherwise, as shown at 320, the state of partial matches is run (FIG. 2E), and as shown at 330, the results are returned.

FIG. 2B shows the initialization process for the phonetic hashing and named entity linking system and method 30 as referenced at 210. The phonetic hashing and named entity linking system and method 30 presumes that entity names provided are a person's name, but the method applies for any multi-word entity name. As shown at 400, the entity name is broken into given name and surname parts. As shown at 410, if the given name is blank, then as shown at 420, a space is used for the given name. As shown at 430, if surname is blank, then as shown at 440, a space is used for the surname.

After initializing based on the candidate name, various partial results lists are initialized: at 450, a First Name Partial Name List is initialized; at 460 Creole Partial Name List is initialized; at 470 Creole First Name Partial Match List is initialized; and at 480 Creole Last Name Partial Match List is initialized.

Creole or creolizing, as used herein, is a phonetic hashing technique. The creolizing process is designed to remove ambiguous sounds and spellings, as well as normalize output so that similar sounds will have the same output. This process is necessary for handling the vagaries of human pronunciation, whether from accents, slurring, enunciation, or other issues. The creolizing process is part of the approximate string matching technique.

FIG. 2C shows the normalization process of the phonetic hashing and named entity linking system and method 30 used at 220 and 240. As shown at 500, all spaces are removed from the text in the normalization process of the phonetic hashing and named entity linking system and method 30. Additionally, as shown at 510, the text is made lower case in the normalization process of the phonetic hashing and named entity linking system and method 30. Continuing, as shown at 520, the results of this normalization process are returned.

FIG. 2D shows the partial match checking process of the phonetic hashing and named entity linking system and method 30 used at 280. As shown at 600, the normalized candidate text and normalized entity name are creolized and compared (FIG. 3A) in the phonetic hashing and named entity linking system and method 30. As shown at 610, if a match of creolized names occurs, then as shown at 620, the entity is recorded in the creole partial match list.

As shown at 630, the first name and last initial are set to the current candidate text in the phonetic hashing and named entity linking system and method 30. As shown at 640, the first name and last initial of the entity name is set to the current entity text. As shown at 650, the first name and last initial of entity name and candidate text are compared in the phonetic hashing and named entity linking system and method 30. As shown at 660, if they are equal, then the entity is recorded in the first name partial match list in the phonetic hashing and named entity linking system and method 30.

As shown at 670, the first name and last initial of the candidate text and entity name are creolized and compared (FIG. 3A) in the phonetic hashing and named entity linking system and method 30. As shown at 680, if a match of the creolized first name and last initial occurs, then as shown at 690, the entity is recorded in the creole first name partial match list in the phonetic hashing and named entity linking system and method 30.

As shown at 700, the last name of the candidate text and the entity are creolized and compared. As shown at 710, if a match of the creolized last name occurs, then at 720 the entity is recorded in the last name partial match list.

Figure 2E:
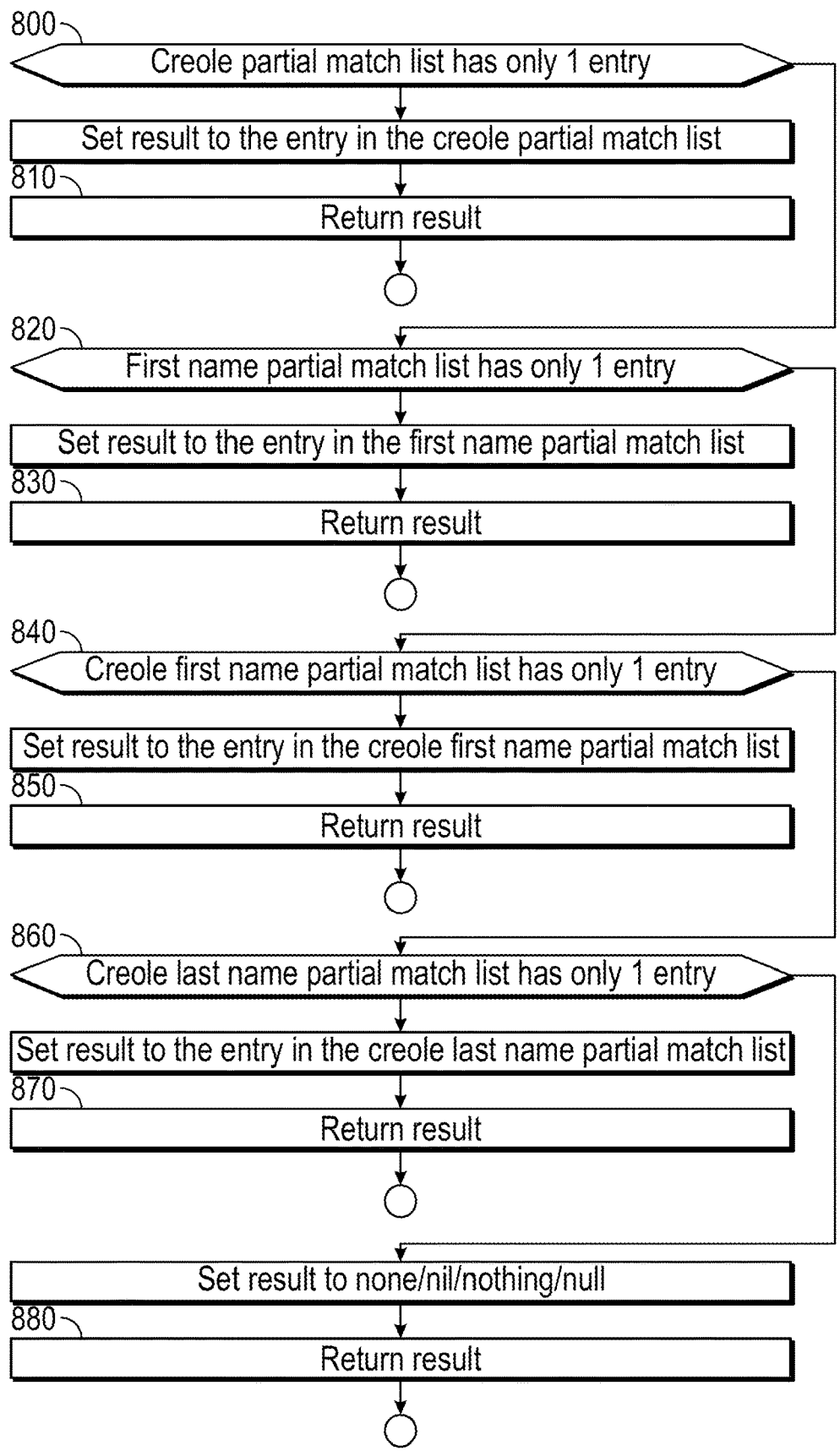
FIG. 2E is a logic flow diagram conceptually illustrating the partial match retrieval process within the named entity linking method according to the embodiments of this present disclosure.

FIG. 2E shows the partial match retrieval process in the phonetic hashing and named entity linking system and method 30 used at 320. FIG. 2E shows how this computer implemented method prioritizes unambiguous matches the most highly, and treats matches according to a specific hierarchy with priority based on how much of the input text it consumes. Thus, a creolized partial match is better than a partial match with the first name and last initial. As shown at 800, if the creole partial match list has only one entry and is, thus, unambiguous then, as shown at 810, the only entity entry in that list is returned as the result of the process. As shown at 820, if the first name partial match list has only one entry and is, thus, unambiguous then, as shown at 830, the only entity entry in that list is returned as the result of the process. As shown at 840, if the creole first name partial match list has only one entry and is, thus, unambiguous then, as shown at 850, the only entity entry in that list is returned as the result of the process. As shown at 860, if the last name partial match list has only one entry and is, thus, unambiguous then, as shown at 870, the only entity entry in that list is returned as the result of the process. As shown at 880, since no unambiguous partial matches have been found, a failure response such as Nil, None, Null, or Nothing.

Figure 3A:
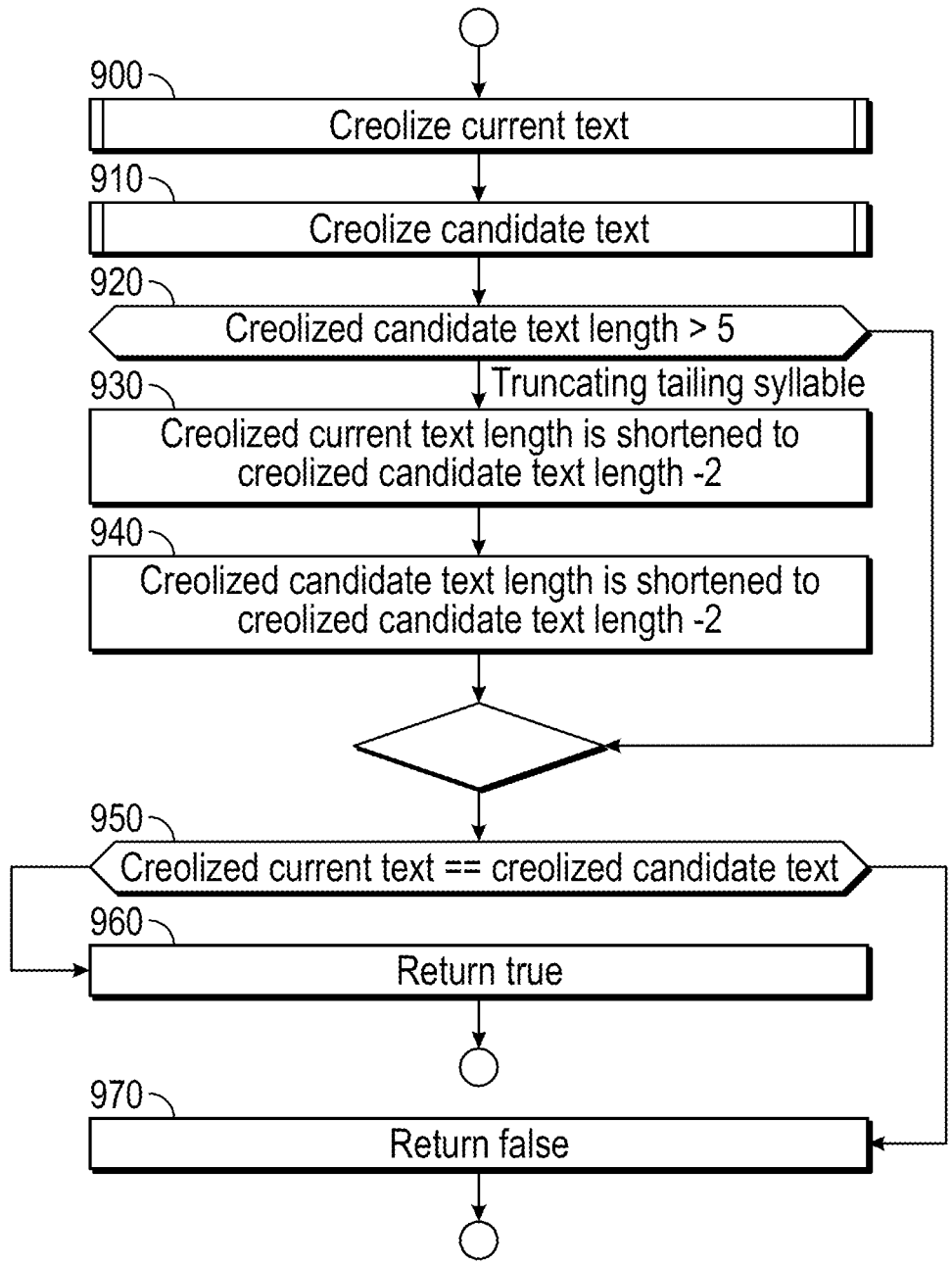
FIG. 3A is a logic flow diagram conceptually illustrating the creolizing and comparing disambiguation process according to the embodiments of this present disclosure.

FIG. 3A shows a creolizing and comparing process in the phonetic hashing and named entity linking system and method 30 used at 600 and 660. The creolizing and comparing process uses the creolize process (FIG. 3B) to creolize current entity text at 900 and creolize the candidate text at 910. Creole or creolizing, as used herein, is a phonetic hashing technique. The creolizing process is designed to remove ambiguous sounds and spellings, as well as normalize output so that similar sounds will have the same output. This process is necessary for handling the vagaries of human pronunciation, whether from accents, slurring, enunciation, or other issues. The creolizing process is part of the approximate string matching technique.

As part of the creolizing process, if the creolized candidate text is longer than five characters at 920 in the phonetic hashing and named entity linking system and method 30, then the current entity's creolized text is shorted by two characters from that of creolized candidate text at 930. The creolized candidate text is shortened by two characters as well at 940. This creolizing technique is used to account for the fact that for longer names, people tend to slur toward the end. If the creolized candidate text and creolized entity text are equal at 950 in the phonetic hashing and named entity linking system and method 30, the system returns an output of "True" at 960, otherwise the system returns an output of "False" at 970.

Figure 3B:
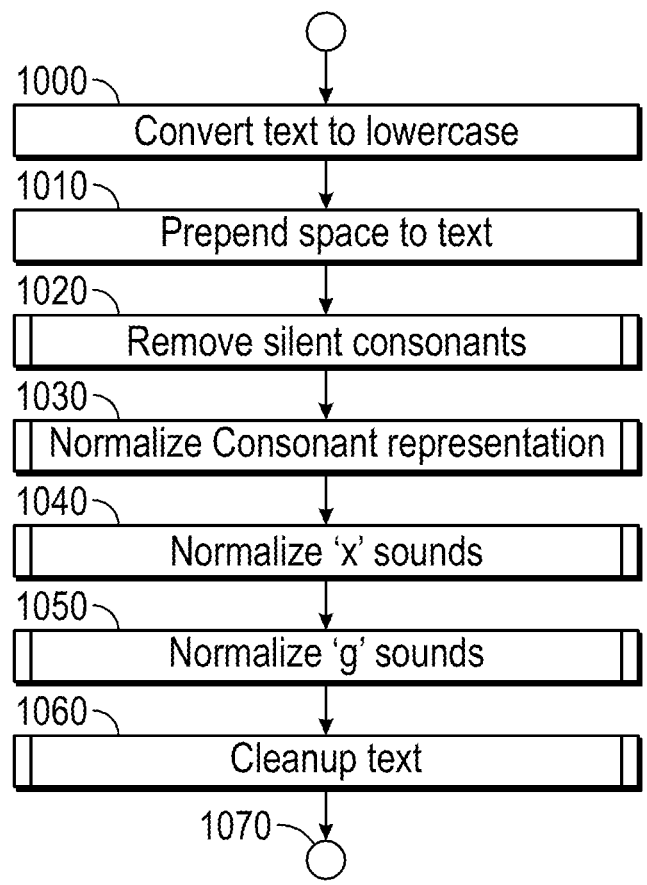
FIG. 3B is a logic flow diagram conceptually illustrating the high level creolizing text process according to the embodiments of this present disclosure.

FIG. 3B shows a high level creolizing text process that is used at 900 and 910 in the phonetic hashing and named entity linking system and method 30. The text is converted to lowercase at 1000 in this creolizing process. Additionally, the text is prefixed with a space at 1010. The space prefix allows for consistent distinguishing of the start of words in the modified text. The remove silent consonant process is executed against the modified text (FIG. 4A) at 1020 in the phonetic hashing and named entity linking system and method 30. The normalizing consonant representation process is executed against the modified text (FIG. 4B) at 1030 in the phonetic hashing and named entity linking system and method 30. The normalize 'x' sounds process is executed against the modified text (FIG. 5A) at 1040 in the phonetic hashing and named entity linking system and method 30. The normalizing 'g' sounds process is executed against the modified text (FIG. 5B) at 1050 in the phonetic hashing and named entity linking system and method 30. The cleanup text process is run against the modified text (FIG. 5C) at 1060 in the phonetic hashing and named entity linking system and method 30. The cleanup text process is necessary because intermediate characters such as "@" and "!!" are used to ensure particular sounds are preserved in a normalized way, but then need to be converted back to the standard spelling representation. The modified text is returned at 1070 in the phonetic hashing and named entity linking system and method 30.

Figure 4A:
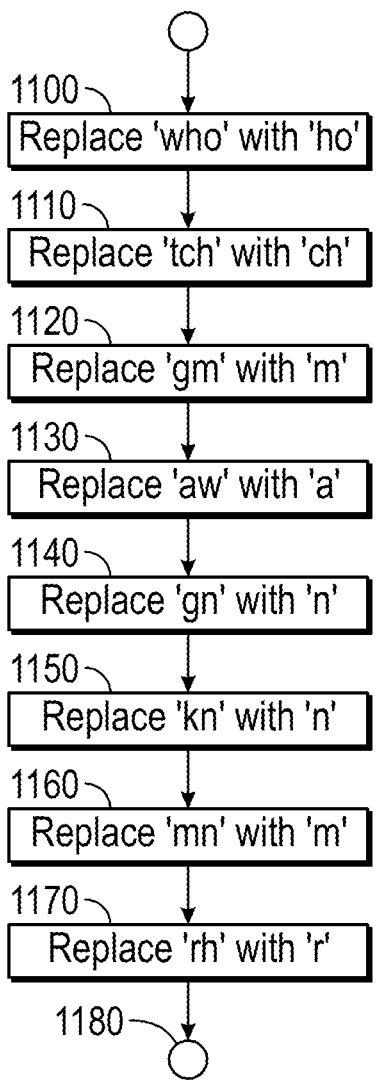
FIG. 4A is a logic flow diagram conceptually illustrating the removing silent consonants portion of the creolizing text process according to the embodiments of this present disclosure.

FIG. 4A shows the process of removing silent consonants that is used at 1020 of FIG. 3B in the phonetic hashing and named entity linking system and method 30. In one implementation, occurrences of the trigram of 'who' are shortened to 'ho' at 1100 in the phonetic hashing and named entity linking system and method 30. In other implementations, occurrences of the trigram 'tch' are shortened to 'ch' at 1110 in the phonetic hashing and named entity linking system and method 30. In still other implementations, occurrences of the digram 'gm' are shortened to 'm' at 1120 in the phonetic hashing and named entity linking system and method 30. In yet other implementations, occurrences of the digram 'aw' are shortened to 'a' at 1130 in the phonetic hashing and named entity linking system and method 30.

In other implementations, occurrences of the digram 'gn' are shortened to 'n' at 1140 in the phonetic hashing and named entity linking system and method 30. In still other implementations, occurrences of the digram 'kn' are shortened to 'n' at 1150 in the phonetic hashing and named entity linking system and method 30. In yet other implementations, occurrences of the digram 'mn' are shortened to 'm' at 1160 in the phonetic hashing and named entity linking system and method 30. In yet other implementations, occurrences of the digram 'rh' are shortened to at 1170 in the phonetic hashing and named entity linking system and method 30. The modified text is returned at 1180 in the phonetic hashing and named entity linking system and method 30.

Figure 4B:
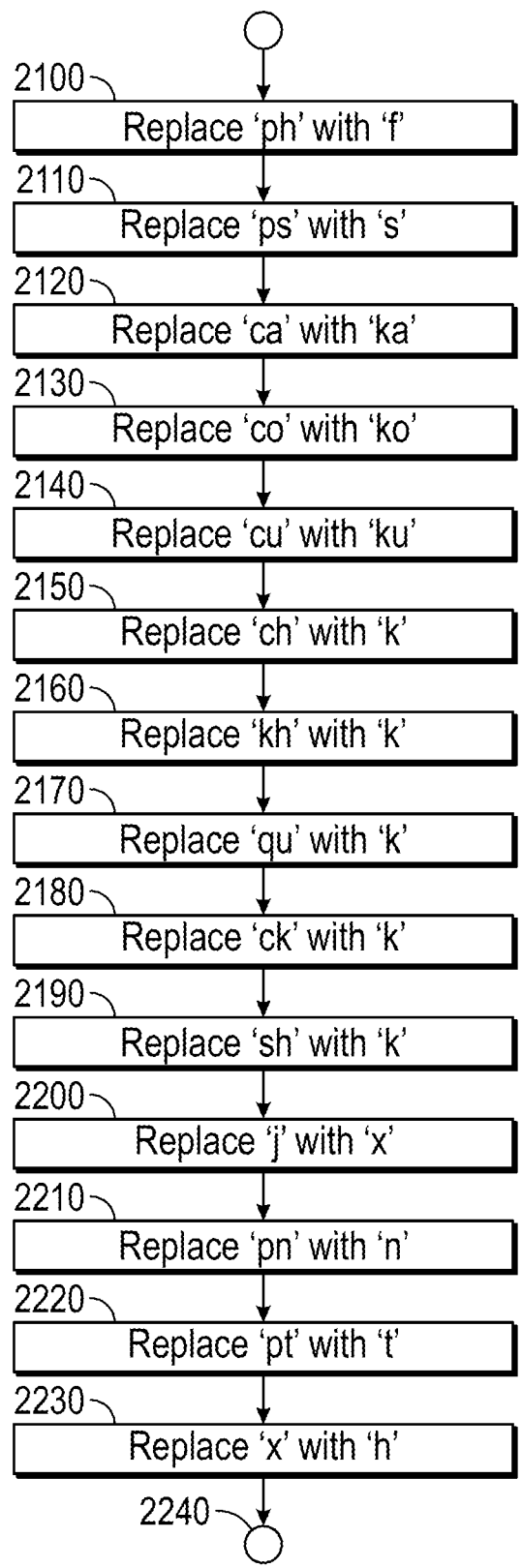
FIG. 4B is a logic flow diagram conceptually illustrating the normalizing consonant sounds portion of the creolizing text process according to the embodiments of this present disclosure.

FIG. 4B shows the normalizing consonant sounds process which is used at 1030 of FIG. 3B in the phonetic hashing and named entity linking system and method 30. In one implementation, occurrences of the digram 'ph' are changed to 'f' at 2100 in the phonetic hashing and named entity linking system and method 30. In other implementations, occurrences of the digram 'ps' are shortened to 's' at 2110 in the phonetic hashing and named entity linking system and method 30. In still other implementations, occurrences of the digram 'ca' are changed to 'ka' at 2120 in the phonetic hashing and named entity linking system and method 30. In yet other implementations, occurrences of the digram 'co' are changed to 'ko' at 2130 in the phonetic hashing and named entity linking system and method 30. In other implementations, occurrences of the digram 'cu' are changed to 'ku' at 2140 in the phonetic hashing and named entity linking system and method 30. In still other implementations, occurrences of the digram 'ch' are changed to 'k' at 2150 in the phonetic hashing and named entity linking system and method 30.

In one implementation, occurrences of the digram 'kh' are shortened to 'k' at 2160 in the phonetic hashing and named entity linking system and method 30. In other implementations, occurrences of the digram 'qu' are changed to 'k' at 2170 in the phonetic hashing and named entity linking system and method 30. In still other implementations, occurrences of the digram 'ck' are shortened to 'k' at 2180 in the phonetic hashing and named entity linking system and method 30. In yet other implementations, occurrences of the digram 'sh' are shortened to 'k' at 2190 in the phonetic hashing and named entity linking system and method 30. In other implementations, occurrences of the letter are changed to 'x' at 2200 in the phonetic hashing and named entity linking system and method 30. In still other implementations, occurrences of the trigram 'pn' are shortened to 'n' at 2210 in the phonetic hashing and named entity linking system and method 30. In yet other implementations, occurrences of the trigram 'pt' are shortened to 't' at 2220 in the phonetic hashing and named entity linking system and method 30. In other implementations, occurrences of the digram 'x' are changed to h' at 2230. The modified text is returned at 2240.

Figure 5A:
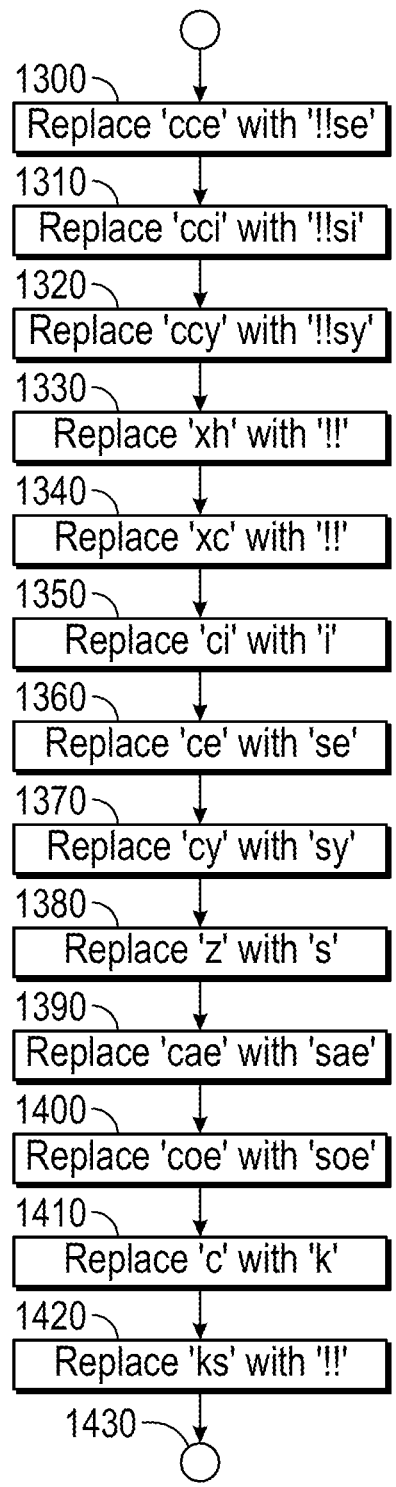
FIG. 5A is a logic flow diagram conceptually illustrating the normalizing 'x' sounds portion of the creolizing text process according to the embodiments of this present disclosure.

FIG. 5A shows the normalizing 'x' sounds process which is used at 1040 of FIG. 3B in the phonetic hashing and named entity linking system and method 30. In one implementation, occurrences of 'cce' are replaced with '!!se', where '!!' is later replaced with 'x' at the end of creolizing process at 1300 in the phonetic hashing and named entity linking system and method 30. In other implementations, occurrences of 'cci' are replaced with '!!si' at 1310 in the phonetic hashing and named entity linking system and method 30. Occurrences of 'ccy' are replaced with '!!sy' at 1320. In still other implementations, occurrences of 'xh' are replaced with '!!' at 1330 in the phonetic hashing and named entity linking system and method 30. In yet other implementations, occurrences of 'xc' are replaced with '!!' at 1340 in the phonetic hashing and named entity linking system and method 30.

In other implementations, occurrences of 'ci' are replaced with at 1350 in the phonetic hashing and named entity linking system and method 30. In still other implementations, occurrences of 'ce' are replaced with 'se' at 1360 in the phonetic hashing and named entity linking system and method 30. In yet other implementations, occurrences of 'cy' are replaced with 'sy' at 1370 in the phonetic hashing and named entity linking system and method 30. In other implementations, occurrences of are replaced with 's' at 1380 in the phonetic hashing and named entity linking system and method 30. In still other implementations, occurrences of 'cae' are replaced with 'sae' at 1390 in the phonetic hashing and named entity linking system and method 30. In yet other implementations, occurrences of 'coe' are replaced with 'soe' at 1400 in the phonetic hashing and named entity linking system and method 30. In other implementations, occurrences of 'k' are replaced with 'k' at 1410 in the phonetic hashing and named entity linking system and method 30. In still other implementations, occurrences of 'ks' are replaced with '!!' at 1420 in the phonetic hashing and named entity linking system and method 30. The modified text is returned at 1430.

Figure 5B:
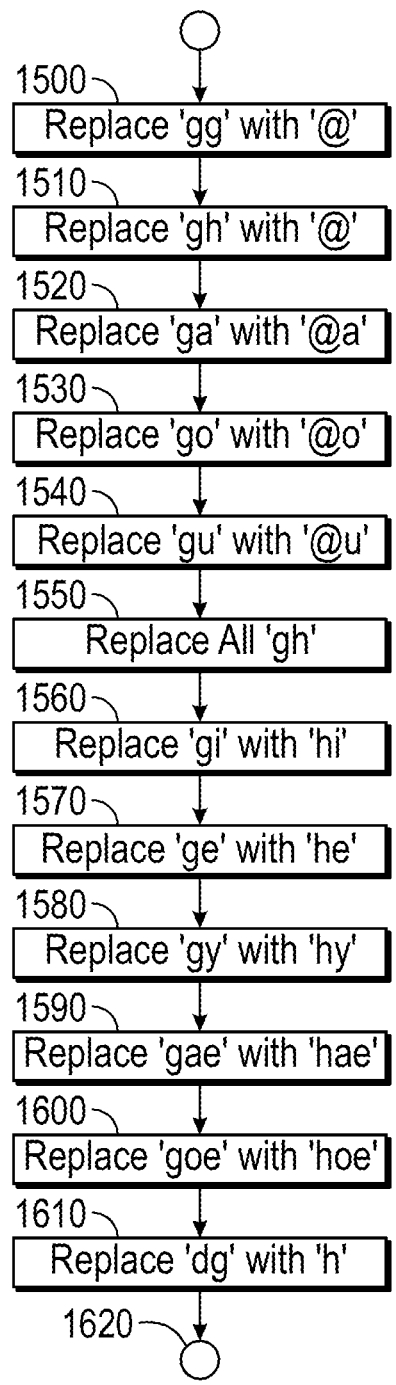
FIG. 5B is a logic flow diagram conceptually illustrating the normalizing 'g' sounds portion of the creolizing text process according to the embodiments of this present disclosure.

FIG. 5B shows the normalizing 'g' sounds process which is used at 1050 of FIG. 3B in the phonetic hashing and named entity linking system and method 30. In one implementation, occurrences of 'gg' are replaced with '@', where '@' is later replaced with 'g' at the end of the creolizing process at 1500 in the phonetic hashing and named entity linking system and method 30. In other implementations, occurrences of 'gh' are replaced with '@' at 1510 in the phonetic hashing and named entity linking system and method 30. In still other implementations, occurrences of 'ga' are replaced with '@a' at 1520 in the phonetic hashing and named entity linking system and method 30. In yet other implementations, occurrences of 'go' are replaced with '@o' at 1530 in the phonetic hashing and named entity linking system and method 30. In other implementations, occurrences of 'gu' are replaced with '@u' at 1540 in the phonetic hashing and named entity linking system and method 30. All occurrences of 'gh' are removed at 1550 in the phonetic hashing and named entity linking system and method 30.

In other implementations, occurrences of 'gi' are replaced with 'hi' at 1560 in the phonetic hashing and named entity linking system and method 30. In still other implementations, occurrences of 'ge' are replaced with 'he' at 1570 in the phonetic hashing and named entity linking system and method 30. In yet other implementations, occurrences of 'gy' are replaced with 'hy' at 1580 in the phonetic hashing and named entity linking system and method 30. In other implementations, occurrences of 'gae' are replaced with 'hae' at 1590 in the phonetic hashing and named entity linking system and method 30. In still other implementations, occurrences of 'goe' are replaced with 'hoe' at 1600 in the phonetic hashing and named entity linking system and method 30. In yet other implementations, occurrences of 'dg' are replaced with 'h' at 1610 in the phonetic hashing and named entity linking system and method 30. The modified text is returned at 1620.

Figure 5C:
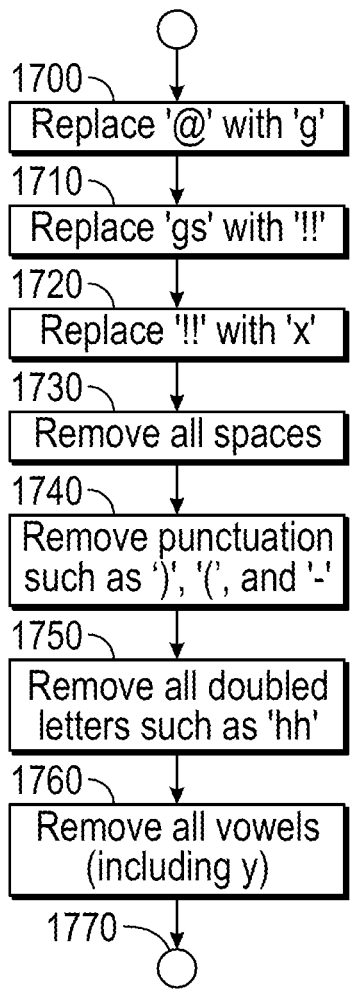
FIG. 5C is a logic flow diagram conceptually illustrating the cleanup portion of the creolizing text process according to the embodiments of this present disclosure.

FIG. 5C shows the cleanup process which is used at 1060 of FIG. 3B in the phonetic hashing and named entity linking system and method 30. In some implementations, occurrences of '@' are replaced with 'g' at 1700 in the phonetic hashing and named entity linking system and method 30. In other implementations, occurrences of 'gs' are replaced with '!!' at 1710 in the phonetic hashing and named entity linking system and method 30. In still other implementations, occurrences of '!!' are replaced with 'x' at 1720 in the phonetic hashing and named entity linking system and method 30. The occurrence of '!!' is more than just at 1710, it can include any of the steps from FIG. 3E as well in the phonetic hashing and named entity linking system and method 30. All spaces are removed from the text at 1730 in the phonetic hashing and named entity linking system and method 30. All punctuation marks, such as '(',')', or '-', are removed from the text at 1740 in the phonetic hashing and named entity linking system and method 30. All doubled letters, such as 'hh' are removed from the text at 1750 in the phonetic hashing and named entity linking system and method 30. All vowels, including 'y', are removed from the text at 1760 in the phonetic hashing and named entity linking system and method 30. The modified text is returned at 1770.

In some implementations, the system or method is employed for phonetic hashing and identifying words or commands from audio information, instead of named entity linking. In some implementations, this system or method may be employed in situations where specific words, groups of words, or commands are expected to be requested so the system or method can employ the same type of matching techniques disclosed above for named entity linking.

In one or more implementations, the system or method for phonetic hashing and identifying words or commands from audio information includes: one or more processors; and a memory device storing a set of instructions that when executed by the one or more processors, causes the one or more processors to: perform phonetic hashing and disambiguation that normalize common sounds and cause similar sounds to generate a same output; remove silent consonants; normalize consonants sounds; remove ending letters from longer words, thereby accounting for speech slurring that occurs with longer words; and remove vowels.

In some implementations, the memory device stores a set of instructions that when executed by the one or more processors, further causes the one or more processors to: perform multiple attempts to resolve non-exact matches using a hierarchical matching system, starting with a strict mechanism, and proceeding sequentially through less strict mechanisms, wherein the hierarchical matching system provides a high resistance to false positives.

Figure 6:
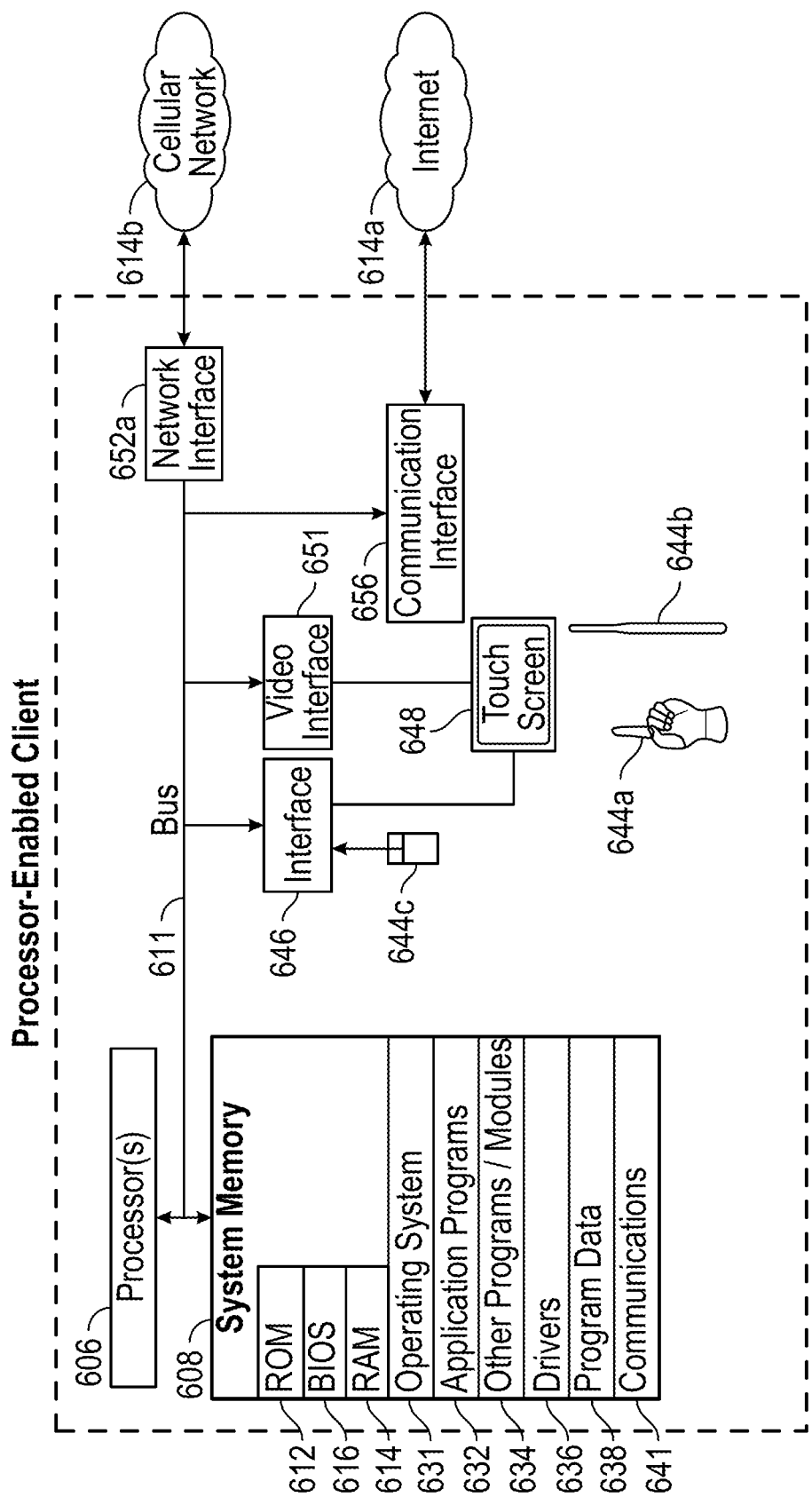
FIG. 6 is a block diagram of an example processor-based client used with a named entity linking method and system.

For use in conjunction with the named entity linking system and method 30, FIG. 6 shows a processor-based device suitable for implementing computing infrastructure for audio speech recognition devices 10, natural language understanding modules 20, named entity linking systems 30, and name repositories 40, as described in FIGS. 1A-5C. Although not required, some portion of the implementations will be described in the general context of processor-executable instructions or logic, such as program application modules, objects, or macros being executed by one or more processors. Those skilled in the relevant art will appreciate that the described implementations, as well as other implementations, can be practiced with various processor-based system configurations, including handheld devices, such as smartphones and tablet computers, wearable devices, multiprocessor systems, microprocessor-based or programmable consumer electronics, personal computers ("PCs"), network PCs, minicomputers, mainframe computers, and the like.

In some implementations, the clients in the phonetic hashing and named entity linking system and method 30 may include one or more processors 606, a system memory 608 and a system bus 611 that couples various system components including the system memory 608 to the processor(s) 606. The processor-based clients will, at times, be referred to in the singular herein, but this is not intended to limit the implementations to a single system, since in certain implementations, there will be more than one system or other networked computing device involved. Non-limiting examples of commercially available systems include, but are not limited to, ARM processors from a variety of manufactures, Core microprocessors from Intel Corporation, U.S.A., PowerPC microprocessor from IBM, Sparc microprocessors from Sun Microsystems, Inc., PA-RISC series microprocessors from Hewlett-Packard Company, and 68xxx series microprocessors from Motorola Corporation.

The processor(s) 606 in the processor-based clients of the phonetic hashing and named entity linking system and method 30 may be any logic processing unit, such as one or more central processing units (CPUs), microprocessors, digital signal processors (DSPs), application-specific integrated circuits (ASICs), field programmable gate arrays (FPGAs), and the like. Unless described otherwise, the construction and operation of the various blocks shown in FIG. 6 are of conventional design. As a result, such blocks need not be described in further detail herein, as they will be understood by those skilled in the relevant art.

The system bus 611 in the processor-based clients of the phonetic hashing and named entity linking system and method 30 can employ any known bus structures or architectures, including a memory bus with a memory controller, a peripheral bus, and a local bus. The system memory 608 includes read-only memory ("ROM") 612 and random access memory ("RAM") 614. A basic input/output system ("BIOS") 616, which can form part of the ROM 612, contains basic routines that help transfer information between elements within a processor-based device, such as during start-up. Some implementations may employ separate buses for data, instructions and power.

The processor-based clients of the phonetic hashing and named entity linking system and method 30 may also include one or more solid state memories; for instance, a Flash memory or solid state drive (SSD), which provides nonvolatile storage of computer-readable instructions, data structures, program modules and other data for the processor-based device. Although not depicted, the processor-based device can employ other non-transitory computer- or processor-readable media, for example, a hard disk drive, an optical disk drive, or a memory card media drive.

Program modules in the processor-based clients of the phonetic hashing and named entity linking system and method 30 can be stored in the system memory 608, such as an operating system 631, one or more application programs 632, other programs or modules 634, drivers 636, and program data 638.

The system memory 608 in the processor-based clients of the phonetic hashing and named entity linking system and method 30 may also include communications programs 641, for example, a server and/or a web client or browser for permitting the processor-based device to access and exchange data with other systems such as user computing systems, websites on the Internet, corporate intranets, or other networks as described below. The communications program 641 in the depicted implementation is markup or data interchange schema based, such as Hypertext Markup Language (HTML), Extensible Markup Language (XML), and Wireless Markup Language (WML), or non-data interchange schema based, such as JavaScript Object Notation Language (JSON). In some embodiments, the communications program 641 operates with markup languages that use syntactically delimited characters added to the data of a document to represent the structure of the document. A number of servers and/or web clients or browsers are commercially available, such as those from Mozilla Corporation of California and Microsoft of Washington.

While shown in FIG. 6 as being stored in the system memory 608, operating system 631, application programs 632, other programs/modules 634, drivers 636, program data 638, and server and/or browser, program modules can be stored on any other of a large variety of nontransitory processor-readable media (e.g., hard disk drive, optical disk drive, SSD and/or flash memory).

A user of a processor-based client of the phonetic hashing and named entity linking system and method 30 can enter commands and information via a pointer, for example, through input devices such as a touch screen 648 via a finger 644*a*, stylus 644*b*, or via a computer mouse or trackball 644*c* which controls a cursor. Other input devices can include a microphone, joystick, game pad, tablet, scanner, biometric scanning device, and the like. These and other input devices (i.e., "I/O devices") are connected to the processor(s) 606 through an interface 646 such as a touch-screen controller and/or a universal serial bus ("USB") interface that couples user input to the system bus 611, although other interfaces such as a parallel port, a game port or a wireless interface or a serial port may be used. The touch screen 648 can be coupled to the system bus 611 via a video interface 651, such as a video adapter to receive image data or image information for display via the touch screen 648. Although not shown, the processor-based client can include other output devices, such as speakers, vibrator, haptic actuator or haptic engine, and the like.

The processor-based clients of the phonetic hashing and named entity linking system and method 30 operate in a networked environment using one or more of the logical connections to communicate with one or more remote computers, servers and/or devices via one or more communications channels, for example, one or more networks 614*a*, 614*b*. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks. Such other types of communication networks include telecommunications networks, cellular networks, paging networks, and other mobile networks.

When used in a networking environment, the processor-based clients of the phonetic hashing and named entity linking system and method 30 may include one or more network, wired or wireless communications interfaces 652*a*, 656 (e.g., network interface controllers, cellular radios, WI-FI radios, Bluetooth radios) for establishing communications over the network, for instance, the Internet 614*a* or cellular network 614*b*.

In a networked environment, program modules, application programs, or data, or portions thereof, can be stored in a server computing system (not shown). Those skilled in the relevant art will recognize that the network connections shown in FIG. 6 are only some examples of ways of establishing communications between computers, and other connections may be used, including wirelessly.

For convenience, the processor(s) 606, system memory 608, and network and communications interfaces 652*a*, 656 are illustrated as communicably coupled to each other via the system bus 611, thereby providing connectivity between the above-described components. In alternative implementations of the processor-based device, the above-described components may be communicably coupled in a different manner than illustrated in FIG. 6. For example, one or more of the above-described components may be directly coupled to other components, or may be coupled to each other, via intermediary components (not shown). In some implementations, system bus 611 is omitted, and the components are coupled directly to each other using suitable connections.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), one or more communicative link(s) through one or more wireless communication protocol(s), and/or optical pathways (e.g., optical fiber), and exemplary communicative couplings include, but are not limited to, electrical couplings, magnetic couplings, wireless couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," "to, at least, provide," "to, at least, transmit," and so on.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art.

For instance, the foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs executed by one or more computers (e.g., as one or more programs running on one or more computer systems), as one or more programs executed by one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method comprising:
performing phonetic hashing and disambiguation that normalize common sounds and cause similar sounds to generate a same output;
checking for partial matches by including a creolizing and comparing disambiguation process; and
removing ending letters from longer names.

2. The method of claim 1, further comprising initializing data by breaking multiple word names into separate parts.

3. The method of claim 1, further comprising normalizing text by removing spaces and making all text lowercase.

4. The method of claim 1, further comprising one or more of:
removing silent consonants;
normalizing consonants sounds; and
removing vowels.

5. The method of claim 1, further comprising employing a partial match retrieval process.

6. The method of claim 1, wherein the removing ending letters from longer names comprises shortening an entity's creolized text by two characters if a creolized candidate text is longer than five characters.

7. The method of claim 1, further comprising employing a high level creolizing text process that provides a space prefix before a text entry for constant distinguishing of a start of a word in a modified text.

8. The method of claim 1, further comprising normalizing 'x' sounds.

9. The method of claim 1, further comprising normalizing 'g' sounds.

10. The method of claim 1, further comprising employing a cleanup process that includes removing placeholder symbols, removing all punctuation, and removing all vowels.

11. The method of claim 5, wherein the partial match retrieval process prioritizes unambiguous matches most highly, and treats matches according to a specific hierarchy with priority based on how much of the input text is consumed.

12. The method of claim 11, wherein priority of the specific hierarchy is as follows: creole partial match; first name partial match; creole first name partial match; and last name partial match.

13. A system comprising:
one or more processors; and
a memory device storing a set of instructions that when executed by the one or more processors, causes the one or more processors to:
perform phonetic hashing and disambiguation that normalize common sounds and cause similar sounds to generate a same output;
checking for partial matches by including a creolizing and comparing disambiguation process;
remove ending letters from longer names; and
perform multiple attempts to resolve non-exact matches using a hierarchical matching system, starting with a strict mechanism, and proceeding sequentially through less strict mechanisms, wherein the hierarchical matching system provides a high resistance to false positives.

14. The system of claim 13, wherein the memory device stores a set of instructions that when executed by the one or more processors, further causes the one or more processors to perform one or more of:
removing silent consonants;
normalizing consonants sounds; and
removing vowels.

15. The system of claim 13, wherein the memory device stores a set of instructions that when executed by the one or more processors, further causes the one or more processors to employ a partial match retrieval process.

16. The system of claim 13, wherein the remove ending letters from longer names comprises shortening an entity's creolized text by two characters if a creolized candidate text is longer than five characters.

17. The system of claim 13, wherein the memory device stores a set of instructions that when executed by the one or more processors, further causes the one or more processors to normalize 'x' sounds.

18. The system of claim 13, wherein the memory device stores a set of instructions that when executed by the one or more processors, further causes the one or more processors to normalize 'g' sounds.

19. The system of claim 13, wherein the memory device stores a set of instructions that when executed by the one or more processors, further causes the one or more processors to employ a cleanup process that includes removing placeholder symbols, removing all punctuation, and removing all vowels.

20. The system of claim 15, wherein the partial match retrieval process prioritizes unambiguous matches most highly, and treats matches according to a specific hierarchy with priority based on how much of the input text is consumed.

21. The system of claim 20, wherein priority of the specific hierarchy is creole partial match, first name partial match, creole first name partial match, and last name partial match.

22. A system comprising:
one or more processors; and
a memory device storing a set of instructions that, when executed by the one or more processors, causes the one or more processors to:
perform phonetic hashing and disambiguation that normalize common sounds and cause similar sounds to generate a same output;
checking for partial matches by including a creolizing and comparing disambiguation process; and
remove ending letters from longer words.

23. The system of claim 22, wherein the memory device stores a set of instructions that, when executed by the one or more processors, further causes the one or more processors to perform multiple attempts to resolve non-exact matches using a hierarchical matching system, starting with a strict mechanism, and proceeding sequentially through less strict mechanisms, wherein the hierarchical matching system provides a high resistance to false positives.

24. The system of claim 22, wherein the memory device stores a set of instructions that when executed by the one or more processors, further causes the one or more processors to perform one or more of:
removing silent consonants;
normalizing consonants sounds; and
removing vowels.

* * * * *